(12) United States Patent
Li et al.

(10) Patent No.: US 12,399,410 B2
(45) Date of Patent: Aug. 26, 2025

(54) DISPLAY PANEL INCLUDING CONDUCTIVE STRUCTURE AND METHOD FOR MANUFACTURING THE SAME, AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Chao Li, Beijing (CN); Wei Zhang, Beijing (CN); Jilei Gao, Beijing (CN); Bin Li, Beijing (CN); Benzhi Xu, Beijing (CN); Xipeng Wang, Beijing (CN); Yunfei Liu, Beijing (CN); Qi Liu, Beijing (CN); Yonggang Zhang, Beijing (CN)

(73) Assignees: HEFEI BOE DISPLAY TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/799,979

(22) PCT Filed: May 14, 2021

(86) PCT No.: PCT/CN2021/093778
§ 371 (c)(1),
(2) Date: Aug. 16, 2022

(87) PCT Pub. No.: WO2022/001415
PCT Pub. Date: Jan. 6, 2022

(65) Prior Publication Data
US 2023/0100946 A1 Mar. 30, 2023

(30) Foreign Application Priority Data
Jun. 29, 2020 (CN) .......................... 202010606435.6

(51) Int. Cl.
*G02F 1/1368* (2006.01)
*G02F 1/133* (2006.01)
(Continued)

(52) U.S. Cl.
CPC ........ *G02F 1/1368* (2013.01); *G02F 1/13306* (2013.01); *G02F 1/13336* (2013.01);
(Continued)

(58) Field of Classification Search
CPC .. G02F 1/133; G02F 1/1333; G02F 1/133388; G02F 1/13306; G02F 1/133512
See application file for complete search history.

(56) References Cited

U.S. PATENT DOCUMENTS

| 5,353,142 A | 10/1994 | Dodd |
| 5,970,885 A | 10/1999 | Polando |

(Continued)

FOREIGN PATENT DOCUMENTS

| CN | 101308267 A | 11/2008 |
| CN | 101615368 A | 12/2009 |

(Continued)

OTHER PUBLICATIONS

Chinese First Office Action (w/ English translation) for corresponding CN Application No. 202010606435.6, mailed Jun. 23, 2022, 15 pages.

(Continued)

*Primary Examiner* — Lauren Nguyen
(74) *Attorney, Agent, or Firm* — Dority & Manning, P.A.

(57) ABSTRACT

A display panel having an active area includes: an array substrate and an opposite substrate disposed opposite to the array substrate. The array substrate includes a first substrate and a conductive structure disposed on the first substrate. The conductive structure is located on a side of the active area. On a side of the conductive structure away from the (Continued)

active area, a side surface of the conductive structure is substantially flush with a side surface of the first substrate. On the side where the conductive structure is located, an edge of an orthographic projection of the opposite substrate on a plane where the array substrate is located is located outside an edge of the array substrate.

16 Claims, 12 Drawing Sheets

(51) Int. Cl.
    *G02F 1/1333*     (2006.01)
    *G02F 1/1335*     (2006.01)
    *G02F 1/1339*     (2006.01)
    *G02F 1/1362*     (2006.01)

(52) U.S. Cl.
    CPC ...... *G02F 1/133512* (2013.01); *G02F 1/1339* (2013.01); *G02F 1/136286* (2013.01); *G02F 2202/28* (2013.01)

(56) References Cited

U.S. PATENT DOCUMENTS

| | | | |
|---|---|---|---|
| 10,798,833 | B1 | 10/2020 | Hsieh et al. |
| 2001/0051385 | A1 | 12/2001 | Eguchi |
| 2002/0019082 | A1* | 2/2002 | Wong ................ H01L 27/1288 257/E21.414 |
| 2002/0173215 | A1 | 11/2002 | Freidhoff et al. |
| 2003/0085208 | A1 | 5/2003 | Umetsu et al. |
| 2015/0309381 | A1 | 10/2015 | Cai et al. |
| 2016/0238880 | A1 | 8/2016 | Liao et al. |
| 2017/0235186 | A1 | 8/2017 | Dong et al. |
| 2018/0173033 | A1* | 6/2018 | Suga ................ G02F 1/133305 |
| 2018/0299724 | A1 | 10/2018 | Gu et al. |
| 2019/0033637 | A1 | 1/2019 | Jeong |
| 2019/0179367 | A1* | 6/2019 | Mathew ........... G02F 1/133528 |
| 2021/0011332 | A1* | 1/2021 | Oh .................... G02F 1/133512 |

FOREIGN PATENT DOCUMENTS

| | | | | |
|---|---|---|---|---|
| CN | 102346321 | A | | 2/2012 |
| CN | 203133441 | U | | 8/2013 |
| CN | 105093629 | A | | 11/2015 |
| CN | 106526954 | A | | 3/2017 |
| CN | 108957878 | A | | 12/2018 |
| CN | 108957883 | A | | 12/2018 |
| CN | 109960085 | A | | 7/2019 |
| CN | 11-0275353 | | * | 9/2019 ....... G02F 1/133788 |
| CN | 110275353 | A | | 9/2019 |
| CN | 11-1341212 | | * | 6/2020 ............ G09F 9/302 |
| JP | 2004258388 | A | | 9/2004 |

OTHER PUBLICATIONS

PCT International Search Report and Written Opinion (w/ English translation) for PCT Application No. PCT/CN2021/093778, mailed Aug. 19, 2021, 18 pages.

* cited by examiner

Provide a display panel motherboard 300, the display panel motherboard 300 including an array substrate motherboard 310 and an opposite substrate motherboard 320 that are arranged opposite to each other, the display panel motherboard 300 having a plurality of active areas AA, the array substrate motherboard 310 including a plurality of gate lines 103 located in each active area AA and a first gate driving circuit 104 and a second gate driving circuit 104 that are respectively located on two opposite sides of each active area AA in an extension direction of the plurality of gate lines 103, the first gate driving circuit 104 and the second gate driving circuit 107 being coupled to the plurality of gate lines 103 — S100

Cut the array substrate motherboard 310 and the opposite substrate motherboard 320 to remove portions of second gate driving circuits 107, so as to form a plurality of display panels 100, each display panel 100 having an active area AA and including an array substrate 10 and an opposite substrate 20; the array substrate 10 including a first substrate 101 and the plurality of gate lines 103, the first gate driving circuit 104 and a remaining portion 105 of the second gate driving circuit that are disposed on the first substrate 101; a side surface, away from the active area AA, of the remaining portion 105 of the second gate driving circuit being substantially flush with a side surface of the first substrate 101; and on a side where the remaining portion 105 of the second gate driving circuit is located, an edge of an orthographic projection of the opposite substrate 20 on a plane where the array substrate 10 is located being located outside an edge of the array substrate 10 — S200

FIG. 15

DISPLAY PANEL INCLUDING CONDUCTIVE STRUCTURE AND METHOD FOR MANUFACTURING THE SAME, AND DISPLAY DEVICE

CROSS-REFERENCE TO RELATED APPLICATIONS

This application is a national phase entry under 35 USC 371 of International Patent Application No. PCT/CN2021/093778 filed on May 14, 2021, which claims priority to Chinese Patent Application No. 202010606435.6, filed on Jun. 29, 2020, which are incorporated herein by reference in their entirety.

TECHNICAL FIELD

The present disclosure relates to the field of display technologies, and in particular, to a display panel and a method for manufacturing the same, and a display device.

BACKGROUND

With the continuous development of display technologies, the market demand for large-size display devices is gradually increasing. A large-size display device, which has a large display area, may be used in, for example, the security fields and the commercial display fields, so that user's requirements for long-distance viewing and display of a large amount of information are met SUMMARY In one aspect, a display panel is provided. The display panel has an active area. The display panel includes an array substrate and an opposite substrate. The opposite substrate and the array substrate are arranged opposite to each other. The array substrate includes a first substrate and a conductive structure disposed on the first substrate. The conductive structure is located on a side of the active area. On a side of the conductive structure away from the active area, a side surface of the conductive structure is substantially flush with a side surface of the first substrate. On the side where the conductive structure is located, an edge of an orthographic projection of the opposite substrate on a plane where the array substrate is located is located outside an edge of the array substrate.

In some embodiments, the array substrate further includes a plurality of gate lines and a first gate driving circuit. The plurality of gate lines are disposed on the first substrate and located in the active area. The gate driving circuit is disposed on the first substrate. In an extension direction of the gate lines, the conductive structure and the first gate driving circuit are located on two opposite sides of the active area, respectively. The plurality of gate lines are coupled to the conductive structure and the first gate driving circuit.

In some embodiments, on a side where the first gate driving circuit is located, a side surface of the opposite substrate is substantially flush with a side surface of the array substrate.

In some embodiments, a distance, on the side where the conductive structure is located, between an edge of the array substrate and an edge of the active area is less than a distance, on a side where the first gate driving circuit is located, of an edge of the array substrate and an edge of the active area.

In some embodiments, the conductive structure includes a remaining portion of a second gate driving circuit.

In some embodiments, the conductive structure includes metal patterns; or the conductive structure includes the metal patterns and semiconductor patterns.

In some embodiments, the display panel further has a bonding area. In a direction perpendicular to the extension direction of the gate lines, the bonding area is located on one of two opposite sides of the active area. On a side where the bonding area is located, an edge of the orthographic projection of the opposite substrate on the plane where the array substrate is located is located on an inner side of an edge of the array substrate.

In some embodiments, in the direction perpendicular to the extension direction of the gate line, on a side of the active area opposite to the bonding area, a side surface of the array substrate is substantially flush with a side surface of the opposite substrate. Alternatively, in the direction perpendicular to the extension direction of the gate lines, on the side of the active area opposite to the bonding area, an edge of the array substrate is located on an inner side of an edge of the orthographic projection of the opposite substrate on the plane where the array substrate is located.

In some embodiments, in a case where, in the direction perpendicular to the extension direction of the gate lines and on the side of the active area opposite to the bonding region, the edge of the array substrate is located on the inner side of the edge of the orthographic projection of the opposite substrate on the plane where the array substrate is located, a distance, on the side where the conductive structure is located, between the edge of the array substrate and the edge of the orthographic projection of the opposite substrate on the plane where the array substrate is located is equal to a distance, on the side of the active area opposite to the bonding area, between the edge of the array substrate and the edge of the orthographic projection of the opposite substrate on the plane where the array substrate is located.

In some embodiments, a distance, on the side where the conductive structure is located, between an edge of the array substrate and an edge of the active area is equal to a distance, on the side of the active area opposite to the bonding area, between an edge of the array substrate and an edge of the active area.

In some embodiments, on the side where the conductive structure is located, a distance between an edge of the array substrate and an edge of the orthographic projection of the opposite substrate on the plane where the array substrate is located is in a range of 0.05 mm to 0.2 mm, inclusive.

In some embodiments, the opposite substrate includes a second substrate and a black matrix. The black matrix is disposed on the second substrate. The conductive structure is within an orthographic projection of the black matrix on the plane where the array substrate is located.

In some embodiments, the display panel further includes a frame sealant. The frame sealant is located on a side of the conductive structure proximate to the opposite substrate. The frame sealant surrounds the active area. An orthographic projection of the frame sealant on the first substrate overlaps with an orthographic projection of the conductive structure on the first substrate.

The side surface, away from the active area, of the conductive structure is substantially flush with a side surface, located on the side where the conductive structure is located and away from the active area, of the frame sealant. Alternatively, an edge, away from the active area, of the orthographic projection of the conductive structure on the first substrate on a side exceeds an edge, located on the side where the conductive structure is located and away from the active area, of the orthographic projection of the frame sealant on the first substrate.

In some embodiments, in a case where the edge, away from the active area, of the orthographic projection of the conductive structure on the first substrate exceeds the edge, located on the side where the conductive structure is located and away from the active area, of the orthographic projection of the frame sealant on the first substrate, a distance between the edge, away from the active area, of the orthographic projection of the conductive structure on the first substrate on the side and the edge, located on the side where the conductive structure is located and away from the active area, of the orthographic projection of the frame sealant on the first substrate is in a range of 0.5 mm to 1 mm, inclusive. A width of the frame sealant is in a range of 0.5 mm to 2 mm, inclusive.

In some embodiments, the display panel further includes an insulating adhesive. The insulating adhesive at least covers a side surface of the display panel on the side where the conductive structure is located.

The display panel further includes a frame sealant, an edge, away from the active area, of an orthographic projection of the conductive structure on the first substrate exceeds an edge, located on the side where the conductive structure is located and away from the active area, of an orthographic projection of the frame sealant on the first substrate, and the insulating adhesive further covers a portion, exceeding the frame sealant in a direction away from the active area, of the conductive structure.

In another aspect, a display device is provided. The display device includes at least two display panels as described in any one of the above embodiments. Each display panel is configured to be capable of being spliced at least at an edge of the display panel on the side where a conductive structure is located.

In some embodiments, the display panel further has a bonding area, the display panel is further configured to be capable of being spliced at an edge of the display panel opposite to an edge of the display panel on a side where the bonding area is located. The display device includes four display panels. The four display panels are arranged in an array.

Two display panels in a same row are spliced with each other at edges thereof on sides where conductive structures are located; and two display panels in a same column are spliced with each other at edges thereof opposite to edges thereof on sides where bonding areas are located.

In some embodiments, a distance between edges of active areas at a splicing position where two adjacent display panels are proximate to each other is in a range of 2 mm to 5 mm, inclusive.

In some embodiments, the display device further includes at least two driving chips and a control mainboard. Each driving chip is bonded to a single display panel. The driving chip is configured to drive the display panel to perform display. The control mainboard is coupled to the at least two driving chips. The control mainboard is configured to provide control signals to the at least two driving chips, so as to control the driving chips to drive the display panels bonded to the driving chips to perform display.

In yet another aspect, a method for manufacturing a display panel is provided. The method includes:
providing a display panel motherboard, wherein the display panel motherboard includes an array substrate motherboard and an opposite substrate motherboard that are arranged opposite to each other; the display panel motherboard has a plurality of active areas; the array substrate motherboard includes a plurality of gate lines located in each active area, and first gate driving circuits and second gate driving circuits, a first gate driving circuit of the first gate driving circuits and a second gate driving circuit of the second gate driving circuits being located on two opposite sides of each active area in an extension direction of the plurality of gate lines; the first gate driving circuit and the second gate driving circuit are coupled to the plurality of gate lines; and
cutting the array substrate motherboard and the opposite substrate motherboard, so as to cut off portions of the second gate driving circuits to form a plurality of display panels, wherein each display panel has an active area, and includes an array substrate and an opposite substrate; the array substrate includes a first substrate, and the plurality of gate lines, a first gate driving circuit and a remaining portion of a second gate driving circuit that are disposed on the first substrate; on a side of the remaining portion of the second gate driving circuit, a side surface of the remaining portion of the second gate driving circuit is substantially flush with a side surface of the first substrate; on a side where the remaining portion of the second gate driving circuit is located, an edge of an orthographic projection of the opposite substrate on a plane where the array substrate is located is located outside an edge of the array substrate.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

FIG. 15 is a flowchart for manufacturing a display panel, in accordance with some embodiments.

DETAILED DESCRIPTION

Figure 1:
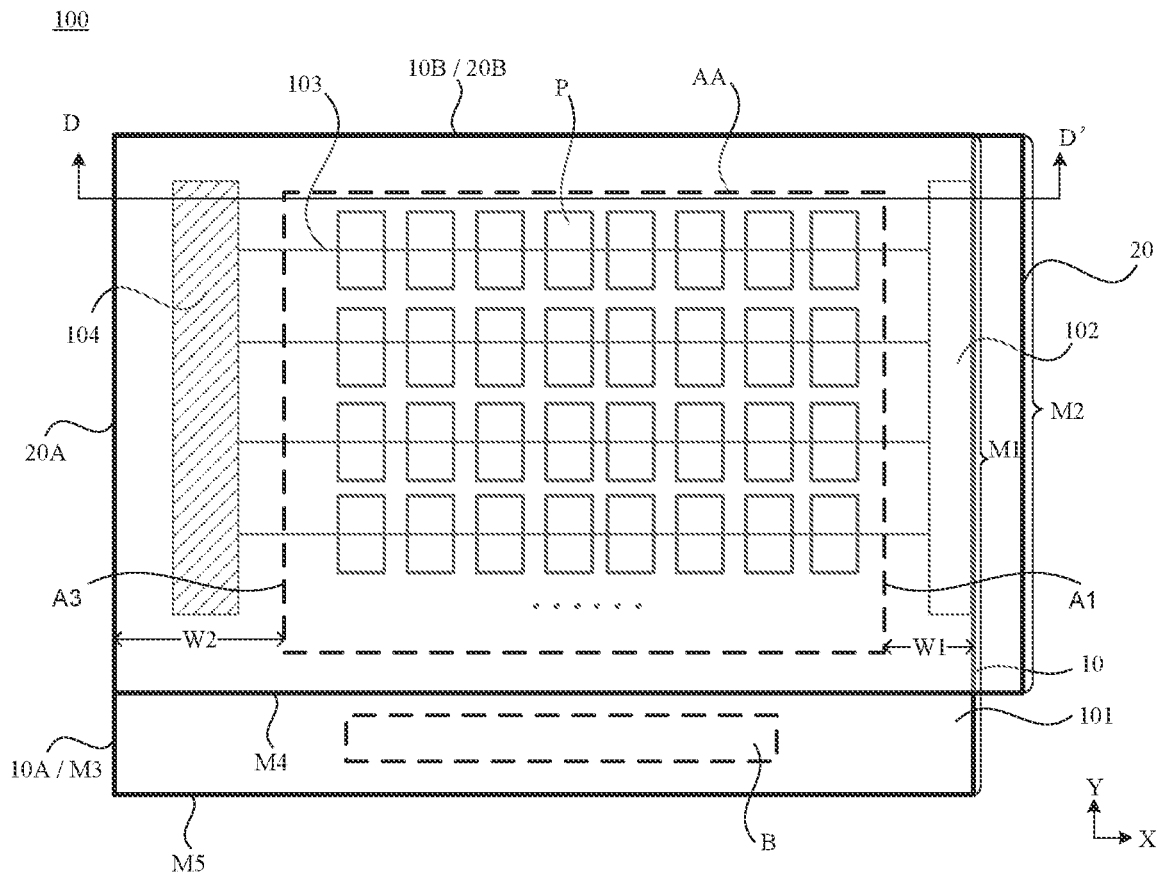
FIG. 1 is a structural diagram of a display panel, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or examples(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

Some embodiments may be described using the terms "coupled" and "connected" and their derivatives. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "applicable to" or "configured to" as used herein indicates an open and inclusive expression, which does not exclude devices that are applicable to or configured to perform additional tasks or steps.

The terms "such as "about", "substantially" or "approximately" as used herein include a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to sectional views and/or plan views as idealized exemplary drawings. In the accompanying drawings, thicknesses of layers and regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of the region in a device, and are not intended to limit the scope of the exemplary embodiments.

At present, a large-size display panel is usually formed by splicing a plurality of display panels. Display effects of the large-size display panel formed by splicing are prone to being affected by a splicing gap. Therefore, a width of the splicing gap may be effectively reduced by using narrow-bezel display panels for splicing, which improves viewing effects of the large-size display panel.

In terms of process, under a prime of ensuring that display panels can display normally, some regions of the display panels may be cut off to obtain the narrow-bezel display panels. For example, as for a display panel driven by gate driving circuits on both sides, a region of the display panel where a gate driving circuit on one side is located may be cut off. However, since conductive patterns such as metal traces exist in the region where the gate driving circuit is located, conductive particles (e.g., metal filings) will be generated during a cutting process. These conductive particles attach to the display panel, which affects quality of the display panel.

Embodiments of the present disclosure provide a display panel 100. As shown in FIG. 1, the display panel 100 has an active area AA. The display panel 100 includes an array substrate 10 and an opposite substrate 20. The array substrate 10 and the opposite substrate 20 are arranged opposite to each other.

Figure 2:
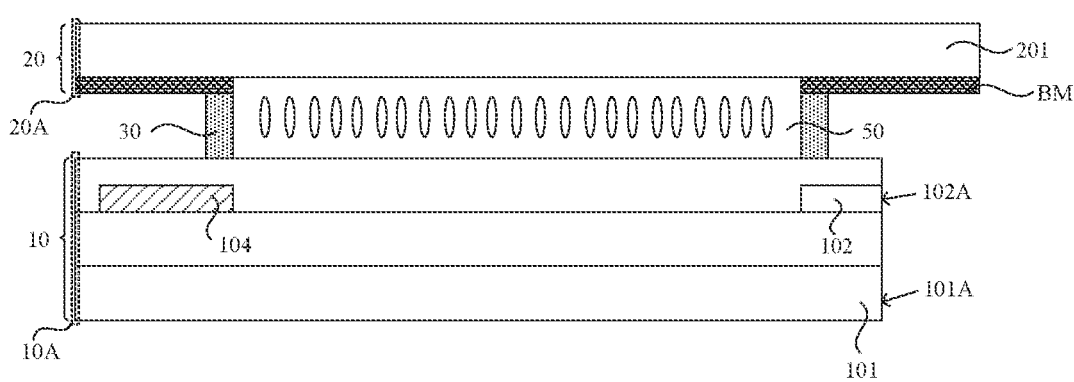
FIG. 2 is a section of the display panel in FIG. 1 taken along the direction D-D'.

As shown in FIGS. 1 and 2, the array substrate 10 includes a first substrate 101 and a conductive structure 102.

The first substrate 101 may include: a rigid substrate (also referred to as a hard substrate) such as glass, or a flexible substrate such as polyimide (PI). The first substrate 101 may further include: film(s) such as a buffer layer disposed on the rigid substrate or the flexible substrate. The conductive structure 102 is disposed on the first substrate 101 and located on a side of the active area AA. As shown in FIGS. 1 and 2, a side surface 102A, away from the active area AA, of the conductive structure 102 is substantially flush with a side surface 101A of the first substrate 101.

It will be noted that, the description that the side surface 102A, away from the active area AA, of the conductive structure 102 is substantially flush with the side surface 101A of the first substrate 101 means that, the side surface 102A, away from the active area AA, of the conductive structure 102 is located or substantially located in a same plane as the side surface 101A of the first substrate 101. That is to say, an edge, away from the active area AA, of an orthographic projection of the conductive structure 102 on the first substrate 101 coincides with an edge of the first substrate 101. The "coincides with" here refers to being located on a same straight line, or refers that a certain distance exists between the edge, away from the active area AA, of the orthographic projection of the conductive structure 102 on the first substrate 101 and the edge of the first substrate 101.

In a case where the edge, away from the active area AA, of the orthographic projection of the conductive structure 102 on the first substrate 101 coincides with the edge of the first substrate 101, the side surface 102A, away from the active area AA, of the conductive structure 102 is flush with the side surface 101A of the first substrate 101.

As shown in FIG. 1, on a side (i.e., a right side of the display panel 100 in FIG. 1) where the conductive structure 102 is located, an edge M2 of an orthographic projection of the opposite substrate 20 on a plane where the array substrate 10 is located is located outside an edge M1 of the array substrate 10 (a side of M1 away from the active area AA, i.e., the right side of the display panel 100 in FIG. 1).

In this case, in terms of process, in a process of cutting a display panel motherboard to form a plurality of display panels 100, the cutting is performed from the side of the display panel 100 where the conductive structure 102 is located, that is, the side surface, away from the active area AA, of the conductive structure 102 is a cut section. On the side where the conductive structure 102 is located, since the edge of the orthographic projection of the opposite substrate 20 on the plane where the array substrate 10 is located is located outside the edge of the array substrate 10, the opposite substrate 20 may shield the array substrate 10. Therefore, it may be possible to prevent conductive particles or impurity debris from falling on the array substrate 10 from on a side, away from the array substrate 10, of the opposite substrate 20 due to gravity, and then prevent the opposite substrate 20 from being charged to affect display effects of the display panel 100.

Therefore, in the display panel 100 in the embodiments of the present disclosure, on the side where the conductive structure 102 is located, the edge of the orthographic projection of the opposite substrate 20 on the plane where the array substrate 10 is located is located outside the edge of the array substrate 10, so that the opposite substrate 20 may shield the array substrate 10. In this way, the conductive particles, which are generated while cutting is performed from the side where the conductive structure 102 is located, may be prevented from falling on the array substrate 10 from the side, away from the array substrate 10, of the opposite substrate 20 due to gravity and then attaching to a surface of the array substrate 10. In this way, it may be possible to prevent a large number of conductive particles from connecting the array substrate 10 and the opposite substrate 20 together to charge the opposite substrate 20, so that a problem that the display panel 100 shows greenish in a dark state, which is caused by the unreleasable charges in the charged opposite substrate 20, may be avoid. Therefore, the display effects of the display panel 100 will not be affected.

In some embodiments, as shown in FIG. 1, the array substrate 10 further includes a plurality of gate lines 103 and a first gate driving circuit 104.

The plurality of gate lines 103 are disposed on the first substrate 101 and located in the active area AA.

The first gate driving circuit 104, which may also be referred to as a gate driver on array (GOA), is disposed on the first substrate 101. Moreover, in an extension direction (i.e., a horizontal direction X in FIG. 1) of the gate lines 103, the conductive structure 102 and the first gate driving circuit 104 are located on two opposite sides of the active area AA, respectively.

The plurality of gate lines 103 are coupled to the conductive structure 102 and the first gate driving circuit 104.

As shown in FIG. 1, the display panel 100 further includes a plurality of sub-pixels P disposed in the active area AA. It will be noted that, FIG. 1 illustrates an example where the plurality of sub-pixels P are arranged in an array. However, embodiments of the present disclosure are not limited thereto. The plurality of sub-pixels P may also be arranged in other manners. For example, the plurality of sub-pixels P are evenly distributed in a plurality of nested circular rings.

Sub-pixels in a same row (i.e., sub-pixels P arranged in a line in the horizontal direction X) are coupled to a same gate line 103. The first gate driving circuit 104 drives the sub-pixels in a same row through the gate line 103, so as to make the sub-pixels P perform display. The first gate driving circuit 104 may sequentially drive the gate lines 103 row by row. That is, the gate lines 103 are provided with scanning signals in sequence.

In some embodiments, on a side where the first gate driving circuit 104 is located, an edge of the orthographic projection of the opposite substrate 20 on the plane where the array substrate 10 is located does not exceed an edge M3 of the array substrate 10.

For example, as shown in FIGS. 1 and 2, on the side where the first gate driving circuit 104 is located, a side surface 20A of the opposite substrate 20 is substantially flush with a side surface 10A of the array substrate 10. That is, on the side where the first gate driving circuit 104 is located, an edge of the orthographic projection of the opposite substrate 20 on the plane where the array substrate 10 is located is located inside or coincides with the edge M3 of the array substrate 10. In this case, an edge of the display panel 100 on the side where the first gate driving circuit 104 is located is flat, so that contact surfaces for splicing two display panels 10 together from sides where first gate driving circuits 104 are located are flat.

In some embodiments, as shown in FIG. 1, a distance W1 between the edge M1 of the array substrate 10 on the side where the conductive structure 102 is located and an edge A1, opposite to the edge M1, of the active area AA is less than a distance W2 between the edge M3 of the array substrate 10 on the side where the first gate driving circuit 104 is located and an edge A3, opposite to the edge M3 of, the active area AA.

In this case, during a process of splicing display panels 100, a splicing gap where splicing is performed on the side where the conductive structure 102 is located is less than a splicing gap where splicing is performed on the side where the first gate driving circuit 104 is located. In this way, a large-sized display panel obtained by splicing the display panels 100 from sides where conductive structures 102 are located has small splicing gap(s), which may improve viewing effects of the user.

It will be noted that, the splicing gap refers to a distance between adjacent edges of active areas AA of two display panels 100 at a splicing position where the two display panels 100 are spliced together.

Figure 3:
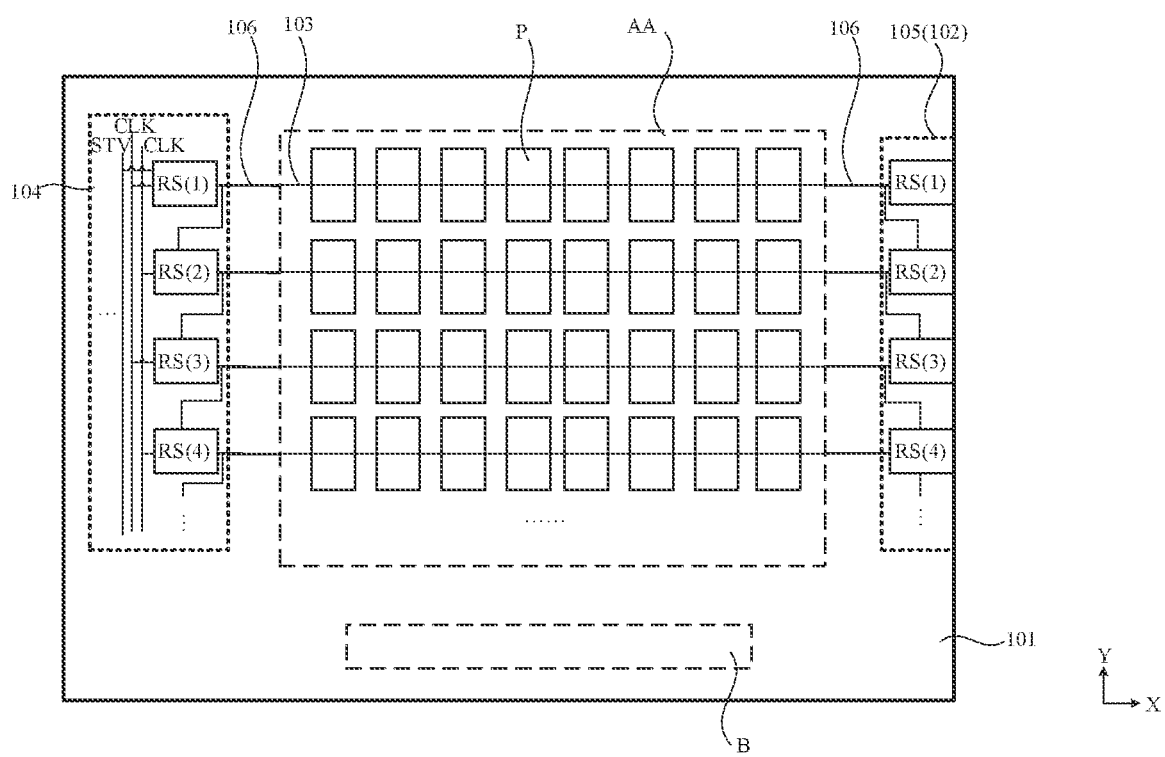
FIG. 3 is a structural diagram of another display panel, in accordance with some embodiments.

In some embodiments, as shown in FIG. 3, the conductive structure 102 includes a remaining portion 105 of a second gate driving circuit.

It will be noted that, the array substrate 10 further includes a plurality of gate leads 106 that are disposed on the first substrate 101 and located outside the active area AA. The first gate driving circuit 104 and the remaining portion 105 of the second gate driving circuit are coupled to the gate lines 103 through the gate leads 106. The gate leads 106 are disposed in a same layer as the gate lines 103, and made of a same material as the gate lines 103.

Figure 4:
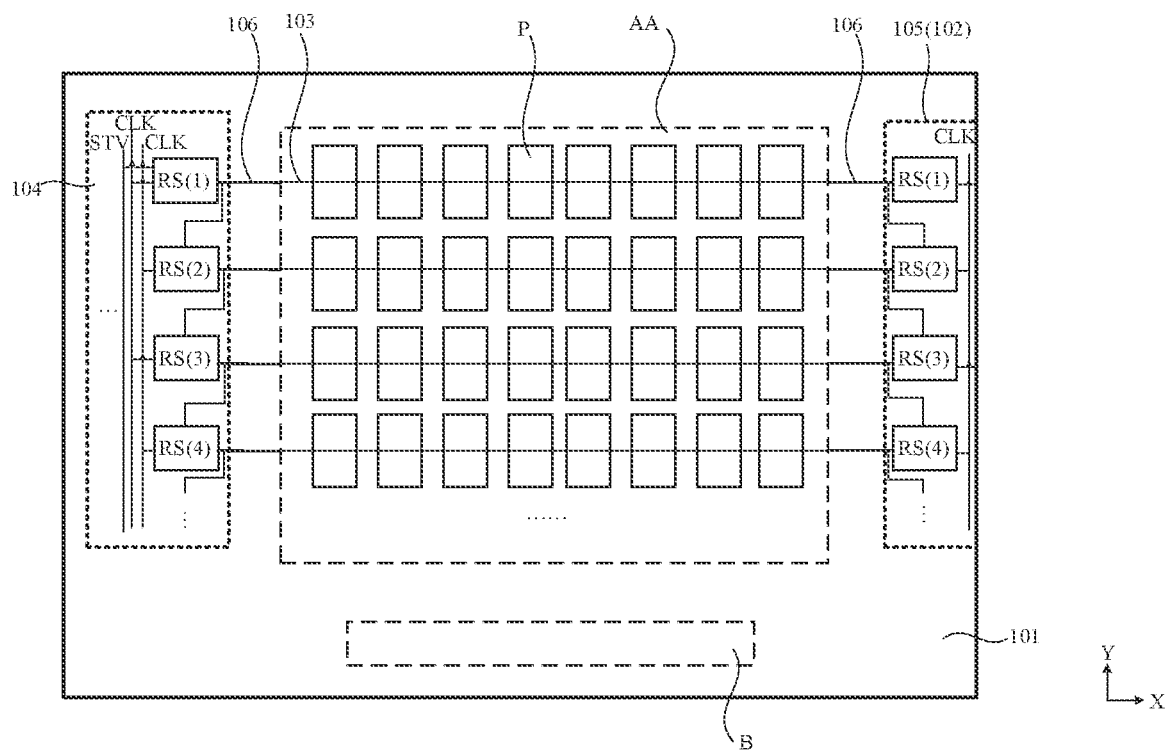
FIG. 4 is a structural diagram of yet another display panel, in accordance with some embodiments.

As shown in FIG. 3, the gate driving circuit described herein includes a plurality of shift registers (RS(1), RS(2), RS(3), RS(4) . . . ) that are cascaded internally and signal lines coupled to the plurality of shift registers RS. The signal lines may include clock signal lines CLK and a starting signal line STV as shown FIG. 4, and may further include a high-level voltage signal line and a low-level voltage signal line (not shown in the figure), etc. The shift registers RS are closer to the active area AA than the signal lines coupled thereto. In this case, the remaining portion 105 of the second gate driving circuit may be a plurality of cascaded shift registers RS (as shown in FIG. 3), or may be the plurality of cascaded shift registers RS and a remaining portion of the signal lines (the clock signal lines CLK shown in FIG. 4) coupled thereto, or may be a remaining portion of the plurality of cascaded shift registers.

Figure 5:
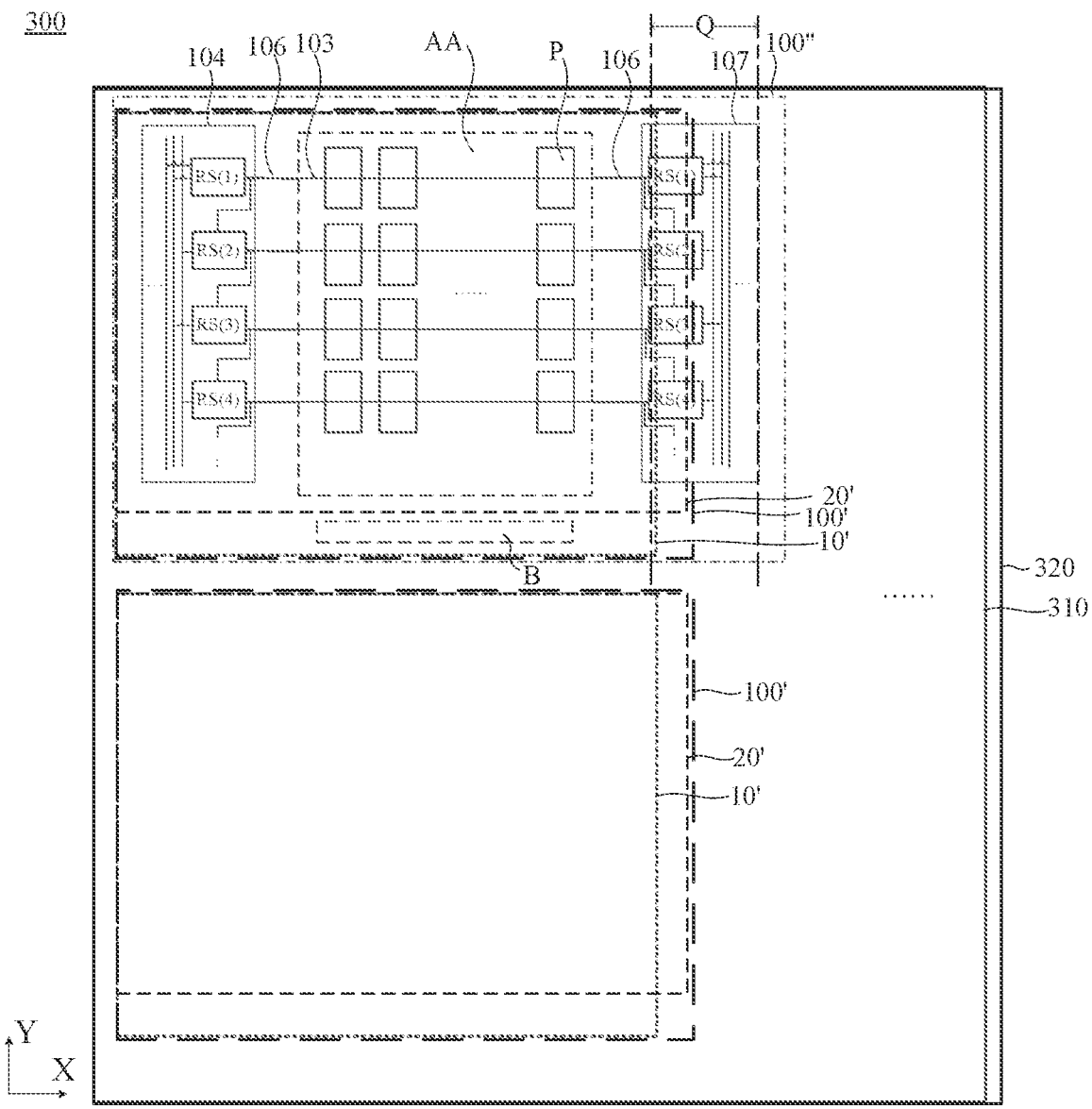
FIG. 5 is a structural diagram of a display panel motherboard, in accordance with some embodiments.

In terms of process, as shown in FIG. 5, a display panel motherboard 300 is cut to form a plurality of display panels 100. The display panel motherboard 300 includes an array substrate motherboard 310 and an opposite substrate motherboard 320. The display panel motherboard 300 has a plurality of regions 100' that are to form the display panels. Before the display panel motherboard 300 is cut, each region 100' that is to form a display panel is provided therein with a plurality of gate lines 103 in an active area AA, and a first gate driving circuit 104 and a second gate driving circuit 107 that are located on two opposite sides of the active area AA in an extension direction of the gate lines 103. In this case, the display panel to be formed is driven in such a manner that the gate driving circuits on both sides drive the display panel simultaneously. That is, the gate lines 103 are sequentially driven row by row from both sides by the first gate driving circuit 104 and the second gate driving circuit 107.

In this case, in order to narrow a splicing gap between two adjacent display panels during a process of splicing the display panels 100, i.e., in order to reduce widths of bezels of the display panels 100, portions of second gate driving circuits 107 will be cut off in the process of cutting the display panel motherboard 300. For example, the cutting is performed in a direction perpendicular to an extension direction of the gate lines 103 (i.e., a vertical direction Y in FIG. 5), and a cutting line may be at any position in a cutting region Q in FIG. 5. An edge of the cutting region Q proximate to the active area AA is located inside an edge of the second gate driving circuit 107 proximate to the active area AA, and an edge, away from the active area AA, of the cutting region Q is located outside an edge, away from the active area AA, of the second gate driving circuit 107. In this way, a portion, away from the active area AA in the extension direction of the gate lines 103, of the second gate driving circuit 107 may be cut off, so that the entire first gate driving circuit 104, the plurality of gate lines 103, and the remaining portion 105 (shown in FIGS. 3 and 4) of the second gate driving circuit are remained in the obtained display panel 100. In this way, the remaining portion 105 of the second gate driving circuit 107 cannot realize a driving function of the second gate driving circuit 107. In this case, the display panel 100 is driven in a single-side driving manner. That is, the gate lines 103 are sequentially driven row by row by the first gate driving circuit 104 located on a single side of the active area AA from the single side, so as to make the display panel 100 perform display normally.

Therefore, portions of the gate driving circuits on one side of the display panel motherboard 300 used for forming double-side driving display panels are removed to obtain the display panels 100. Compared with a double-side driving display panel, a bezel of the display panel 100 is narrower. For example, the region 100' that is to form the display panel in the present disclosure is less than a region 100" that is to form the double-side driving display panel in the related art. That is, the bezel of the display panel 100 in the present disclosure is narrower than a bezel of the double-side driving display panel in the related art. In this way, during the splicing process, the width of the splicing gap between the display panels 100 in the present disclosure becomes narrower compared with a width of a splicing gap between the double-sided driving display panels in the related art, so that the viewing effects of the users is improved.

Moreover, since the edge of the orthographic projection of the opposite substrate 20 of the display panel 100 on the plane where the array substrate 10 is located is located outside the edge of the array substrate 10, the opposite substrate 20 may shield the array substrate 10. Therefore, the conductive particles, which are generated when cutting is performed from the side where the conductive structure 102 is located, may be prevented from falling on the array substrate 10 from the side, away from the array substrate 10, of the opposite substrate 20 due to gravity and then attaching to the surface of the array substrate 10. In this way, it may be possible to prevent a large number of conductive particles from connecting the array substrate 10 and the opposite substrate 20 together to charge the opposite substrate 20, so that the problem that the display panel 100 shows greenish in the dark state, which is caused by the unreleasable charges in the charged opposite substrate 20, may be avoid. Therefore, the display effects of the display panel 100 will not be affected.

In addition, in some of the related art, no conductive structure is formed on a side of an active area AA opposite to a first gate driving circuit 104 in an extension direction of gate lines 103, so no conductive particles are generated during the cutting process. In this case, it may be possible to avoid the problem that the display effects are affected by a large number of conductive particles which connects an array substrate 10 and an opposite substrate 20 together to charge the opposite substrate 20. Furthermore, in a display panel obtained by cutting, a side surface of the array substrate is flush with a side surface of the opposite substrate. However, for an original production line for manufacturing double-side driving display panels, an additional mask used for forming the single-side gate driving circuits needs to be designed, which will greatly increase production costs.

In contrast, in the embodiments of the present disclosure, on a side where the remaining portion 105 of the second gate driving circuit is located, an edge of the orthographic projection of the opposite substrate 20 on the plane where the array substrate 10 is located is located outside an edge of the array substrate 10, so that the opposite substrate 20 may shield the array substrate 10. Therefore, it may be possible to prevent the conductive particles generated in the process of cutting the second gate driving circuit 107 from falling on the array substrate 10 from the side, away from the array substrate 10, of the opposite substrate 20, which avoids the problem that the display effects of the display panel 100 are affected by the charged opposite substrate 20. Compared with a case where the mask for forming the single-side gate driving circuits is used, and no conductive structure is formed on the side of the active area AA opposite to the first gate driving circuit 104 in the extension direction of the gate lines 103, so as to prevent the conductive particles from being generated during the cutting process, an existing mask for forming double-side gate driving circuits may be directly used in the production line for manufacturing the double-side driving display panels in the embodiments of the present disclosure. Therefore, no additional masks need to be designed, which reduces the production costs under a premise of ensuring the quality of the display panels.

Figure 6:
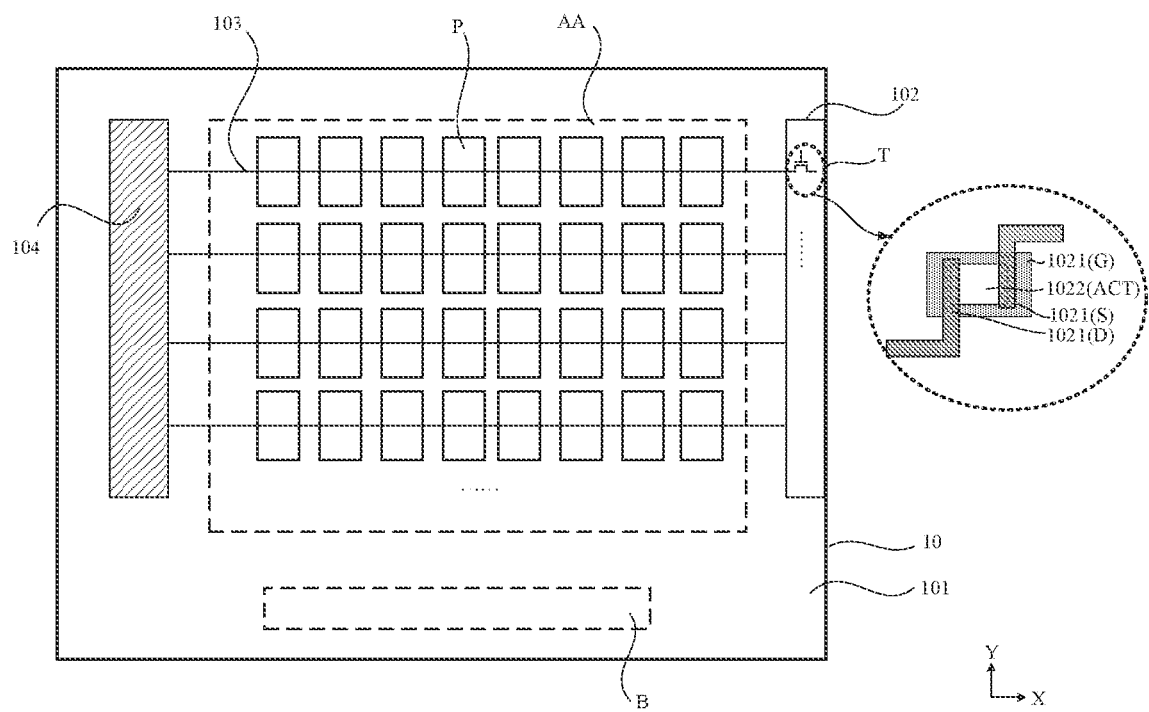
FIG. 6 is a structural diagram of an array substrate, in accordance with some embodiments.

In some embodiments, as shown in FIG. 6, the conductive structure 102 includes metal patterns 1021, or the metal patterns 1021 and semiconductor patterns 1022.

Figure 7:
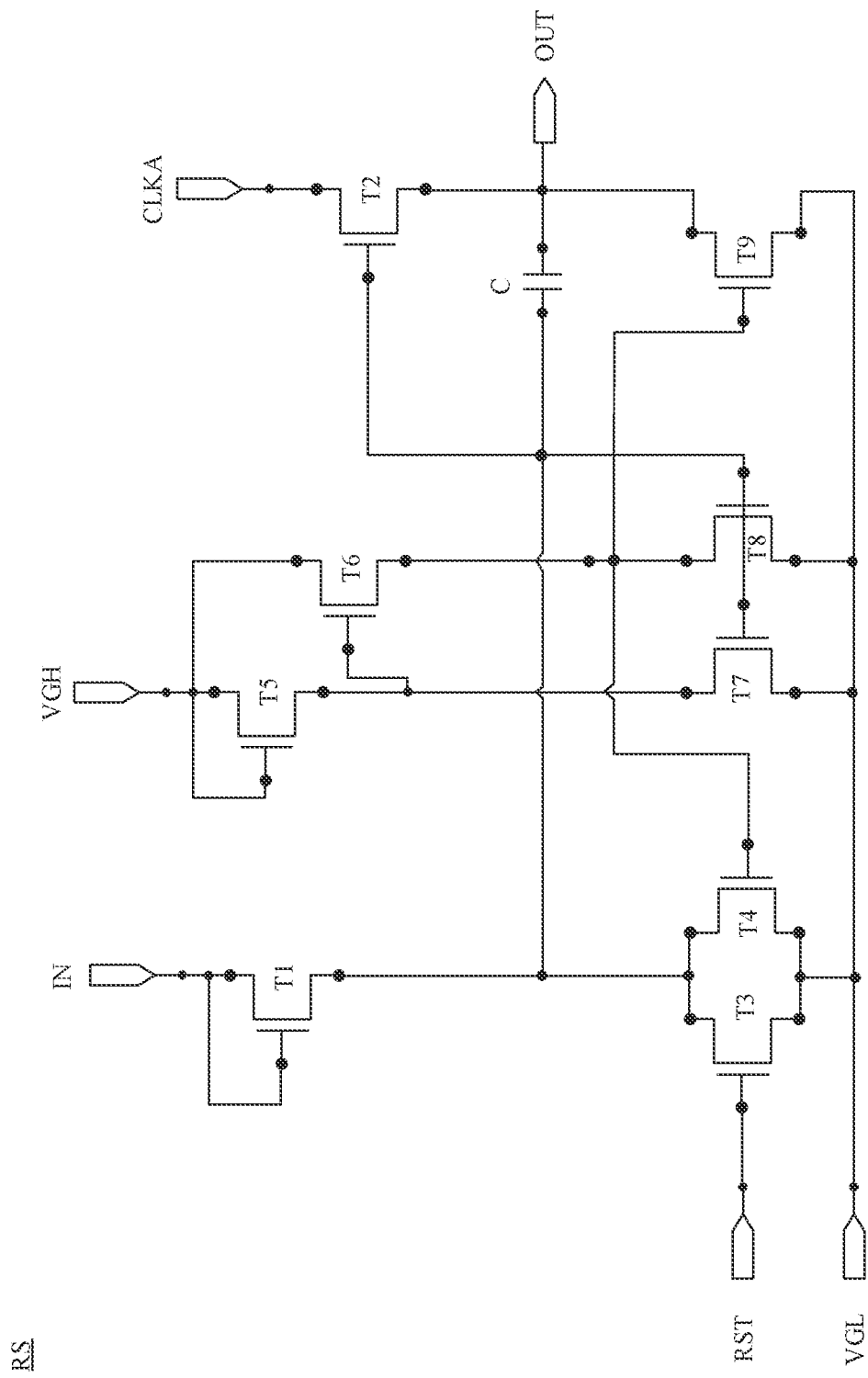
FIG. 7 is a structural diagram of a shift register, in accordance with some embodiments.

For example, the second gate driving circuit 107 before cutting includes a plurality of shift registers RS. Each shift register RS includes a plurality of transistors and a storage capacitor C. As shown in FIG. 7, the shift register RS includes nine transistors (T1 to T9) and the storage capacitor C. The shift register RS is coupled to an input terminal IN, an output terminal OUT, a first voltage terminal VGH, a second voltage terminal VGL, a clock signal terminal CLKA and a reset signal terminal RST. The clock signal terminal CLKA is coupled to a clock signal line CLK. The input terminal IN of a first-stage shift register is coupled to the start signal line STV. The first voltage terminal VGH and the second voltage terminal VGL are connected to a high-level voltage signal line and a low-level voltage signal line, respectively. Other than the first-stage shift register, an input terminal IN of a shift register of each stage is coupled to an output terminal OUT of a shift register of a previous stage. Other than a last-stage shift register, a reset signal terminal RST of a shift register of each stage is further coupled to an output terminal OUT of a shift register of a next stage, so as to perform reset. The output terminal OUT of the shift register is coupled to a gate line 103, so as to output a driving signal to the gate line 103.

As shown in FIG. 6, each transistor T includes a gate G, an active layer ACT, a source S and a drain D. The active layer ACT is made of a semiconductor. The gate G, the source S and the drain D are all made of metals. In this way, in the process of cutting the display panel motherboard 300 to form the display panels 100, according to different cutting positions, for example, in a process of cutting the shift registers RS in the second gate driving circuit 107, the conductive structure 102 may include the metal patterns 1021, the metal pattern 1021 may be at least one of the gate G, the source S and the drain D of the transistor T, or the conductive structure 102 may further include the semiconductor patterns 1022, the semiconductor pattern 1022 may be the active layer ACT of the transistor T. In a case signal lines coupled to the shift registers are cut, since materials of the signal lines are metals, the metal patterns 1021 included in the conductive structure 102 may be remaining portions of the signal lines.

It will be noted that, FIG. 6 is only a structural diagram of a single transistor T in a case where the conductive structure 102 is the remaining portion of the second gate driving circuit and the transistor T is in the remaining portion of the second gate driving circuit. An actual structure of the remaining portion of the second gate driving circuit is not limited thereto. FIG. 7 is only a schematic diagram of a shift register of the gate driving circuit. A structure of the shift register of the gate driving circuit described in the present disclosure is not limited thereto.

In some embodiments, as shown in FIG. 1, the display panel 100 further has a bonding area B. In a direction perpendicular to the extension direction of the gate lines 103, the bonding area B is located on one of two opposite sides of the active area AA.

It will be understood that, the bonding area B is configured to be bonded to driving circuits. For example, the bonding area B is bonded to an integrated circuit (IC) and a flexible printed circuit (FPC).

On a side where the bonding area B is located, an edge M4 of the orthographic projection of the opposite substrate 20 on the plane where the array substrate 10 is located is located inside an edge M5 of the array substrate 10. In this way, there is enough space on the side where the bonding area B is located, which facilitates the bonding of the driving circuits.

In some embodiments, as shown in FIG. 1, in the direction (i.e., the vertical direction Y in FIG. 1) perpendicular to the extension direction of the gate lines 103, on a side of the active area AA opposite to the bonding area B, a side surface 10B of the array substrate 10 is substantially flush with a side surface 20B of the opposite substrate 20.

That is, in the direction perpendicular to the extension direction of the gate lines 103, on the side of the active area AA opposite to the bonding area B, an orthographic projection of an edge of the array substrate 10 on the opposite substrate 20 coincides with or is at a certain distance from an edge of the opposite substrate 20.

It will be understood that, an distribution density of conductive patterns (such as metal lines) of the array substrate 10 on the side of the active area AA opposite to the bonding area B is less than an distribution density of conductive patterns on the side where the bonding area B is located. Therefore, when the cutting is performing from the side of the active area AA opposite to the bonding area B, a small number of conductive particles are generated.

In this way, in the process of cutting the display panel motherboard to form the display panels 100, cutting is performed from the side of the active area AA opposite to the bonding area B, so that the side surface of the array substrate 10 is substantially flush with the side surface of the opposite substrate 20, and an edge of the display panel 100 on the side of the active area AA opposite to the bonding area B is flat. Therefore, a bezel of the display panel 100 on the side of the active area AA opposite to the bonding area B is narrowed. When splicing is performed on the side of the active area AA of the display panel 100 opposite to the bonding area B, a splicing gap is narrowed, thereby improving the user's viewing effects.

Figure 8:
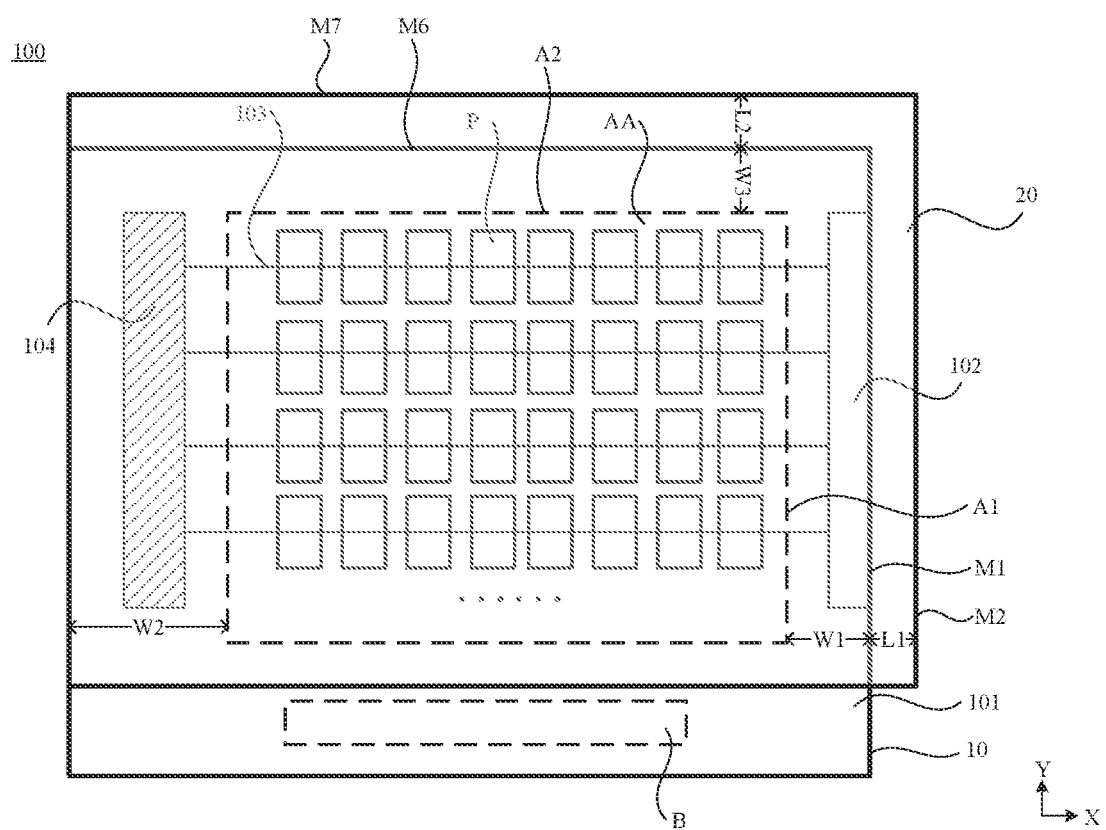
FIG. 8 is a structural diagram of yet another display panel, in accordance with some embodiments.

In some other embodiments, as shown in FIG. 8, in the direction (i.e., the vertical direction Y in FIG. 8) perpendicular to the extension direction of the gate lines 103, on the side of the active area AA opposite to the bonding area B, the edge M6 of the array substrate 10 is located inside an edge M7 of the orthographic projection of the opposite substrate 20 on the plane where the array substrate 10 is located.

In this case, on the side of the active area AA opposite to the bonding area B, the opposite substrate 20 may shield the array substrate 10. Therefore, impurities and debris such as conductive particles in the environment may be prevented from falling on the array substrate 10 from the side, away from the array substrate 10, of the opposite substrate 20 due to gravity and then attaching to the surface of the array substrate 10. Then, it may be possible to prevent a large number of conductive particles from connecting the array substrate 10 and the opposite substrate 20 together to charge the opposite substrate 20, so that the problem that the display panel 100 shows greenish in the dark state, which is caused by the unreleasable charges in the charged opposite substrate 20, may be avoid. Therefore, the display effects of the display panel 100 will not be affected.

In some embodiments, as shown in FIG. 8, a distance W1 between the edge M1 of the array substrate 10 on the side where the conductive structure 102 is located and an edge A1 of the active area AA is equal to a distance W3 between the edge M6 of the array substrate 10 on the side of the active area AA opposite to the bonding area B and an edge A2 of the active area AA. That is, W1=W3.

In this case, a width of a bezel of the display panel 100 on the side of the active area AA opposite to the bonding area B may be reduced. Moreover, when splicing is performed on the side of the active area AA opposite to the bonding area B, a width of a splicing gap may be reduced, which improves the viewing effects of the display panel after splicing.

In some embodiments, as shown in FIG. 8, a distance L1 between the edge of the array substrate 10 and the edge of the orthographic projection of the opposite substrate 20 on the plane where the array substrate 10 is located on the side where the conductive structure 102 is located is equal to a distance L2 between the edge of the array substrate 10 and the edge of the orthographic projection of the opposite substrate 20 on the plane where the array substrate 10 is located on the side of the active area AA opposite to the bonding area B. That is, L1=L2.

In this case, during the splicing process of the display panels 100, a width of a splicing gap on the side where the conductive structure 102 is located is substantially equal to a width of a splicing gap on the side of the active area AA opposite to the bonding area B. In this way, a difference in width of the splicing gaps between the display panels after splicing is reduced, which improves uniformity of widths of the splicing gaps, thereby improving the viewing effects of the spliced display panels.

For example, with reference to FIG. 8, on the side where the conductive structure 102 is located, the distance L1 between the edge M1 of the array substrate 10 and the edge M2 of the orthographic projection of the opposite substrate 20 on the plane where the array substrate 10 is located is in a range of 0.05 mm to 0.2 mm, inclusive. For example, the distance L1 is 0.1 mm, 0.15 mm or 0.18 mm. Correspondingly, on the side of the active area AA opposite to the bonding area B, the distance L2 between the edge M6 of the array substrate 10 and the edge M7 of the orthographic projection of the opposite substrate 20 on the plane where the array substrate 10 is located is in a range of 0.05 mm to 0.2 mm, inclusive.

In some embodiments, as shown in FIG. 1, the active area AA is in a shape of a quadrilateral. For example, the quadrilateral may be a rectangle or a rectangle-like shape. The rectangle-like shape refers to: a shape with four straight sides in total, every two adjacent straight sides of which are perpendicular to each other, and at least two adjacent straight sides of which are connected by a curve. For example, a shape that is formed by turning four corners of a rectangle into rounded corners may be referred to as the rectangle-like shape.

For example, the display panel 100 may also be in a shape of a quadrilateral. For example, the quadrilateral may be a rectangle or a rectangle-like shape.

It will be noted that, those skilled in the art may design the shape of the display panel 100 and the shape of the active area AA according to an actual situation such as a need for splicing the display panels 100. For example, the shape of the display panel 100 and the active area AA may be a hexagon or an octagon, which is not limited here.

Figure 9:
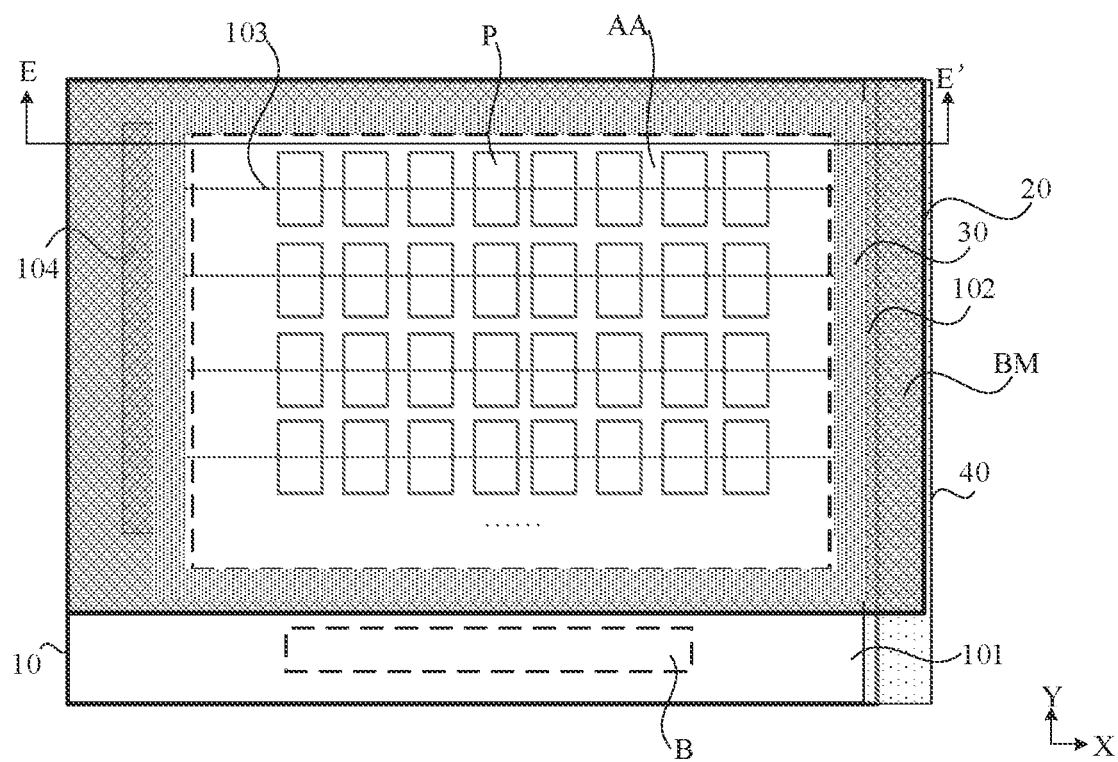
FIG. 9 is a structural diagram of yet another display panel, in accordance with some embodiments.
Figure 10:
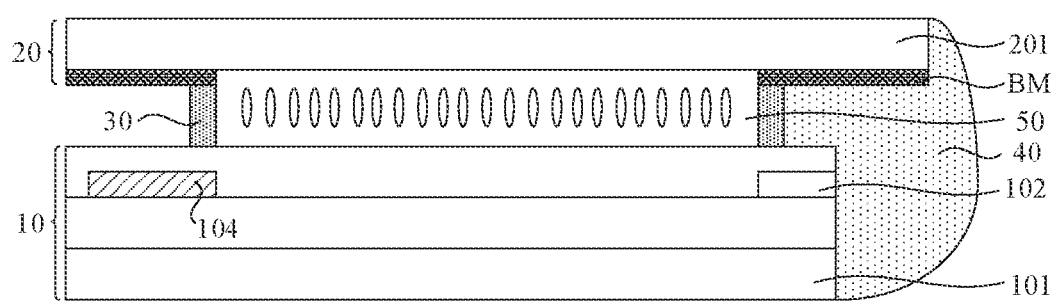
FIG. 10 is a section of the display panel in FIG. 9 taken along the direction E-E'.

In some embodiments, as shown in FIGS. 9 and 10, the opposite substrate 20 includes a second substrate 201 and a black matrix BM disposed on the second substrate 201.

The conductive structure 102 is located within an orthographic projection of the black matrix BM on the plane where the array substrate 10 is located.

For example, the black matrix BM is disposed around outer sides of the active area AA.

In this case, on the side where the conductive structure 102 is located, since the edge of the orthographic projection of the opposite substrate 20 on the plane where the array substrate 10 is located is located outside the edge of the array substrate 10, the opposite substrate 20 may shield the array substrate 10 when cutting is performed from the side where the conductive structure 102 is located. Therefore, impurities and debris such as conductive particles may be prevented from falling on the array substrate 10 from the side, away from the array substrate 10, of the opposite substrate 20 due to gravity. Then, it may be possible to prevent a large number of conductive particles from connecting the array substrate 10 and the black matrix BM together to charge the black matrix BM, so that a problem that the display panel 100 shows greenish in the dark state, which is caused by unreleasable charges in the charged black matrix BM, may be avoid. Therefore, the display effects of the display panel 100 will not be affected.

In some embodiments, a resistance value of the black matrix BM is in a range of $10^{-13}\Omega$ to $10^{-15}\Omega$, inclusive. In this case, an impedance of the BM is relatively high, which may prevent the black matrix BM from being charged to affect the display effects of the display panel 100.

It will be noted that, in a case where the impedance of the black matrix BM is high, since the black matrix BM has a relatively low charge, an impact of the black matrix BM on the display effects of the display panel 100 may be ignored. In this case, on the side where the conductive structure 102 is located, a side surface of the opposite substrate 20 may be substantially flush with a side surface of the array substrate 10, so that an edge of the display panel 100 is flat.

In some embodiments, as shown in FIGS. 9 and 10, the display panel 100 further includes a frame sealant 30. The frame sealant 30 is located on a side of the conductive structure 102 proximate to the opposite substrate 20.

As shown in FIG. 9, the frame sealant 30 surrounds the AA.

An orthographic projection of the frame sealant 30 on the first substrate 101 overlaps with the orthographic projection of the conductive structure 102 on the first substrate 101.

For example, a width of the frame sealant 30 is in a range of 0.5 mm to 2 mm, inclusive. For example, the width of the frame sealant 30 is 0.1 mm or 0.15 mm.

Figure 11:
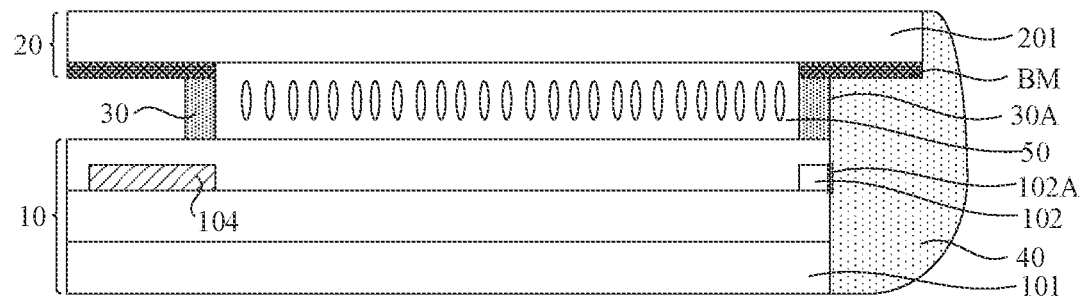
FIG. 11 is another section of the display panel in FIG. 9 taken along the direction E-E', in accordance with some embodiments.

As shown in FIG. 11, the side surface 102A, away from the active area AA, of the conductive structure 102 is substantially flush with a side surface 30A, located on the side where the conductive structure 102 is located and away from the active area AA, of the frame sealant 30.

It will be noted that, the description that the side surface 102A, away from the active area AA, of the conductive structure 102 is substantially flush with the side surface 30A, located on the side where the conductive structure 102 is located and away from the active area AA, of the frame sealant 30 means that, an orthographic projection of an edge, away from the active area AA, of the conductive structure 102 on the first substrate 101 coincides with or at a certain distance from an orthographic projection of an edge, located on the side where the conductive structure 102 is located and away from the active area AA, of the frame sealant 30.

Alternatively, as shown in FIG. 10, an edge, away from the active area AA, of the orthographic projection of the conductive structure 102 on the first substrate 101 exceeds an edge, located on the side where the conductive structure 102 is located and away from the active area AA, of the orthographic projection of the frame sealant 30 on the first substrate 102.

In this case, a distance between the edge, away from the active area AA, of the orthographic projection of the conductive structure 102 on the first substrate 101 and the edge, located on the side where the conductive structure 102 is located and away from the active area AA, of the orthographic projection of the frame sealant 30 on the first substrate 102 is in a range of 0.5 mm to 1 mm, inclusive. For example, the distance is 0.55 mm, 0.6 mm or 0.75 mm.

In some embodiments, as shown in FIGS. 9 and 10, the display panel 100 further includes an insulating adhesive 40. The insulating adhesive 40 covers at least a side surface of the display panel 100 on the side where the conductive structure 102 is located.

It will be understood that, on the side of the display panel 100 where the conductive structure 102 is located, the insulating adhesive 40 covers the side surface of the array substrate 10 and the side surface of the opposite substrate 20.

The insulating adhesive 40 covers the side surface, away from the active area AA, of the conductive structure 102. In this case, since the side surface, away from the active area AA, of the conductive structure 102 is a cut section in the cutting process of forming the display panel 100, and the cut section is exposed, the insulating adhesive 40 covers the side surface of the display panel 100 on the side where the conductive structure 102 is located. Therefore, the side surface of the display panel 100 on the side where the conductive structure 102 is located may be protected, and thus the external moisture and oxygen may be prevented from entering the conductive structure 102. Moreover, since the insulating adhesive 40 covers the side surface, away from the active area AA, of the conductive structure 102, the exposed surface of the conductive structure 102 may be protected, and thus the external moisture and oxygen may be prevented from entering the conductive structure 102.

In addition, in the process of forming the display panel 100, in a case where the cutting is performed on the side of the active area AA opposite to the bonding area B, the insulating adhesive 40 may further cover a side surface of the display panel 100 on the side of the active area AA opposite to the bonding area B. Therefore, the side surface is protected, and the external moisture and oxygen may be prevented from entering the display panel 100.

It will be noted that, the insulating adhesive 40 does not cover a side surface of the display panel 100 on a side where the bonding area B is located.

As shown in FIG. 10, in a case where the display panel 100 includes the frame sealant 30, and the edge, away from the active area AA, of the orthographic projection of the conductive structure 102 on the first substrate 101 exceeds an edge, located on the side where the conductive structure 102 is located and away from the active area AA, of the orthographic projection of the frame sealant 30 on the first substrate 102, the insulating adhesive 40 may protect the portion of the conductive structure 102 exceeding the frame sealant 30 in the direction away from the active area AA, thereby preventing the external moisture and oxygen from entering the conductive structure 102.

Figure 12:
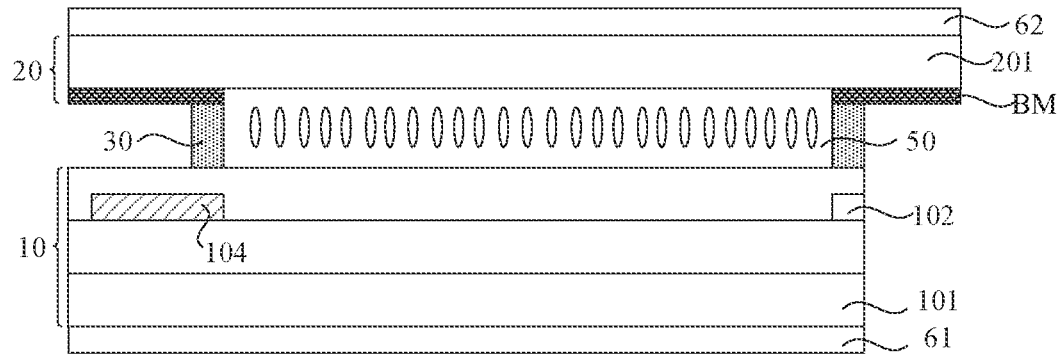
FIG. 12 is yet another section of the display panel in FIG. 9 taken along the direction E-E', in accordance with some embodiments.

In some embodiments, as shown in FIG. 12, the display panel 100 further includes a liquid crystal layer 50. The liquid crystal layer 50 is located between the opposite substrate 20 and the array substrate 10.

It will be understood that, in a case where the display panel 100 includes the frame sealant 30, the liquid crystal layer 50 is located on an inner side of the frame sealant 30.

In addition, in some embodiments, as shown in FIG. 12, the display panel 100 further includes a first polarizer 61 and a second polarizer 62.

The first polarizer 61 is located on a side of the array substrate 10 away from the opposite substrate 20. The second polarizer 62 is located on a side of the opposite substrate 20 away from the array substrate 10.

Figure 13:
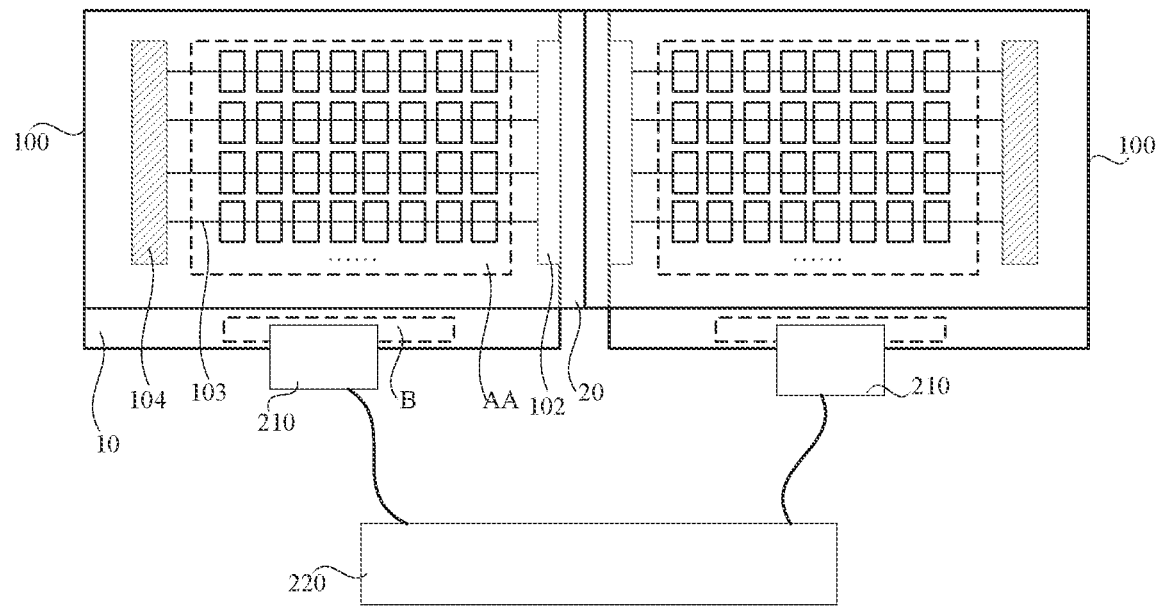
FIG. 13 is a structural diagram of a display device, in accordance with some embodiments.

Embodiments of the present disclosure provide a display device 200. As shown in FIG. 13, the display device 200 includes at least two display panels 100 as described in any one of the above embodiments.

Each display panel 100 is configured to be capable of being spliced at least at an edge of the display panel 100 on the side where the conductive structure 102 is located.

It will be noted that, those skilled in the art may select a structure, such as a sticky adhesive, for fixing two display panels 100 spliced to each other, which is not limited here.

For example, the display device may be any device displays images whether in motion (e.g., videos) or stationary (e.g., still images) and whether text or images. More specifically, it is anticipated that the embodiments may be implemented in a variety of electronic devices or associated with a variety of electronic devices. The variety of electronic devices include (but are not limited to) game consoles, television monitors, flat panel displays, computer monitors, automobile displays (e.g., odometer displays), navigators, cockpit controllers and/or displays, electronic photos, electronic billboards or signs, projectors, building structures, packaging and aesthetic structures (e.g., displays for displaying an image of a piece of jewelry), etc.

Figure 14:
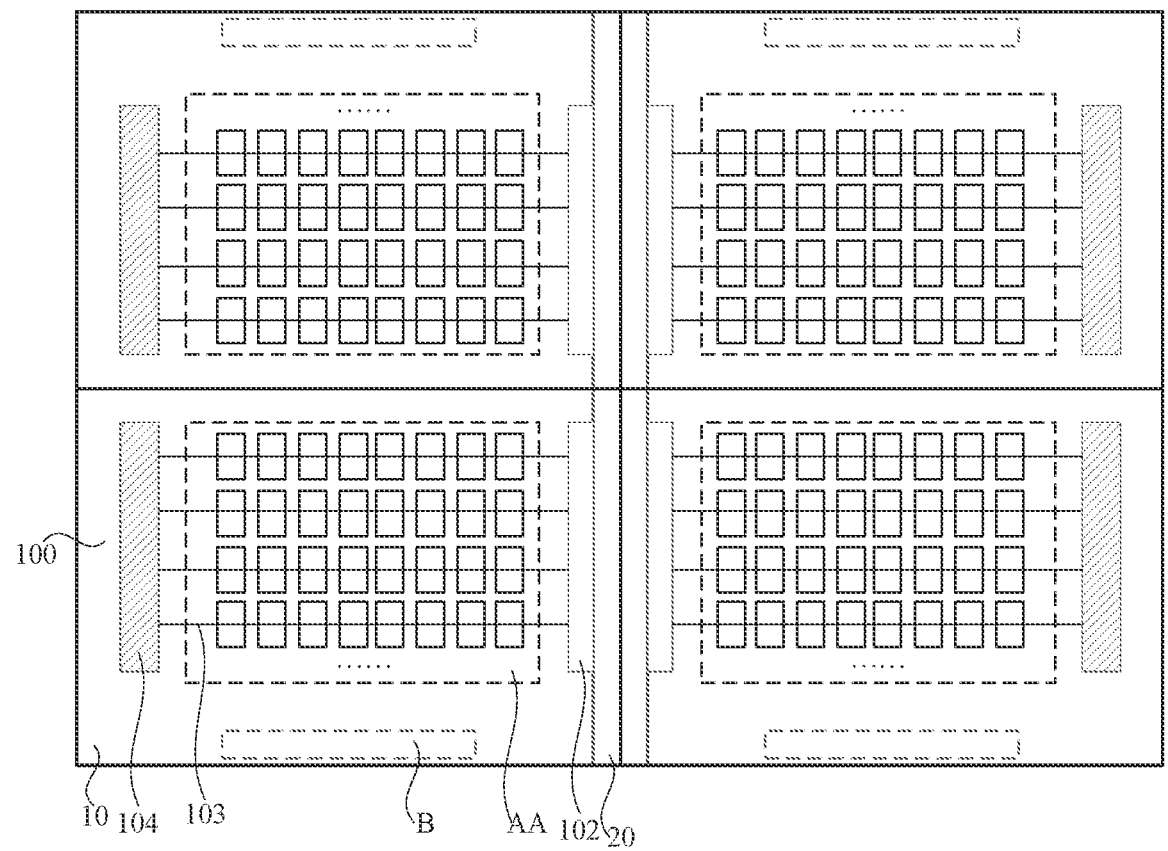
FIG. 14 is a structural diagram of another display device, in accordance with some embodiments.

In some embodiments, as shown in FIG. 14, in a case where the display panel 100 has the bonding area B, the display panel 100 is further configured to be capable of being spliced at an edge of the display panel 100 opposite to an edge of the display panel 100 on the side where the bonding area B is located.

The display device 200 includes four display panels 100. The four display panels 100 are arranged in an array.

Two display panels 100 in a same row are spliced with each other at edges thereof on sides where conductive structures 102 are located, and two display panels 100 in a same column are spliced with each other at edges of the two display panels 100 opposite to edges of the two display panels 100 on sides where bonding areas B are located.

For example, at a splicing position, a distance between edges of active areas AA where two adjacent display panels 100 are proximate to each other is in a range of 2 mm to 5 mm, inclusive. For example, the distance is 3 mm or 4 mm.

In some embodiments, as shown in FIG. 13, the display device 200 further includes at least two driving chips 210 and a control mainboard 220.

A single driving chip 210 is coupled to a single display panel 100. The driving chip 210 is configured to drive the display panel 100 to perform display.

It will be understood that, the driving chip 210 is bonded in the bonding area B of the display panel 100. For example, the driving chip 210 includes driving IC (a source IC). The driving IC is coupled to a plurality of data lines of the display panel 100, so as to provide data signals to the plurality of data lines.

The control mainboard 220 is coupled to the at least two driving chips 210. The control mainboard 220 is configured to provide control signals to the at least two driving chips 210, so as to control the driving chips 210 to drive the display panels 100 bonded to the driving chips 210 to perform display.

For example, the driving chip 210 may be a chip on film (COF). The control mainboard 220 may be a system on chip (SOC).

The display device 200 further includes control circuit boards. A single control circuit board is coupled to a single driving chip 210.

For example, the control circuit board includes a timing controller (T-CON). The T-CON is configured to provide timing control signals to the driving chip 210 coupled thereto.

In this case, a side of the driving chip 210 is bonded to the display panel 100, and another side of the driving chip 210 is bonded to a side of a printed circuit board (PCB). Another side of the PCB is coupled to the control circuit board through a flexible flat cable (FFC). The control circuit board is coupled to the control mainboard 220 through a signal transmission interface such as a V-by-ONE interface specially developed for image transmission. The control mainboard 220 may control the display panels 100 uniformly or individually through the control circuit boards and the driving chips 210.

Embodiments of the present disclosure provide a method for manufacturing the display panel 100. As shown in FIG. 15, the method includes the following steps.

In a step S100, with reference to FIG. 5, a display panel motherboard 300 is provided, the display panel motherboard 300 includes an array substrate motherboard 310 and an opposite substrate motherboard 320 that are arranged opposite to each other. The display panel motherboard 300 has a plurality of active areas AA. The array substrate motherboard 310 includes a plurality of gate lines 103 located in each active area AA and a first gate driving circuit 104 and a second gate driving circuit 104 that are respectively located on two opposite sides of each AA in an extension direction of the plurality of gate lines 103. The first gate driving circuit 104 and the second gate driving circuit 107 are coupled to the plurality of gate lines 103.

In a step S200, the array substrate motherboard 310 and the opposite substrate motherboard 320 are cut to remove portions of second gate driving circuits 107, so as to form a plurality of display panels 100. Each display panel 100 has an active area AA. Each display panel 100 includes an array substrate 10 and an opposite substrate 20. The array substrate 10 includes a first substrate 101 and the plurality of gate lines 103, the first gate driving circuit 104 and a remaining portion 105 of the second gate driving circuit that are disposed on the first substrate 101. A side surface, away from the active area AA, of the remaining portion 105 of the second gate driving circuit is substantially flush with a side surface of the first substrate 101. On a side where the remaining portion 105 of the second gate driving circuit is located, an edge of an orthographic projection of the opposite substrate 20 on a plane where the array substrate 10 is located is located outside an edge of the array substrate 10.

For example, with reference to FIG. 5, the display panel motherboard 300 has a plurality of regions 100' that are to form the display panels. A region 100' that is to from a display panel includes a region 10' that is to form the array substrate and a region 20' that is to form the opposite substrate. Array substrates 10 are obtained by cutting the array substrate motherboard 310 according to regions 10' that are to form the array substrates, and opposite substrates 20 are obtained by cutting the opposite substrate motherboard 320 according to regions 20' that are to form the opposite substrates.

Therefore, in the embodiments of the present disclosure, for a production line for manufacturing double-side driving display panels, the portions of the second gate driving circuits 107 are cut off, so that bezels of the display panels 100 are narrowed, which reduces widths of splicing gaps during the process of splicing the display panels 100. In addition, on the side where the remaining portion 105 of the second gate driving circuit is located, the edge of the orthographic projection of the opposite substrate 20 on the plane where the array substrate 10 is located is located outside the edge of the array substrate 10, so that the opposite substrate 20 may shield the array substrate 10. Therefore, it may be possible to prevent conductive particles generated in the process of cutting the second gate driving circuit 107 from falling on the array substrate 10 from the side of the opposite substrate 20 away from the array substrate 10, which avoids the problem that the display effects of the display panel 100 are affected by the charged the opposite substrate 20. Compared with a case where a mask for forming single-side gate driving circuits is used, and no conductive structure is formed on the side of the AA opposite to the first gate driving circuit 104 in the extension direction of the gate lines 103, so as to prevent the conductive particles from being generated during the cutting process, a mask using for forming double-side gate driving circuits in a production line for manufacturing the double-side driving display panels does not need to be redesigned in the embodiments of the present disclosure, which reduces the production costs.

It will be noted that, the method for manufacturing the display panel 100 has the same beneficial effects as the display panel 100 described above.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel having an active area, the display panel comprising:
    an array substrate including:
        a first substrate and a conductive structure disposed on the first substrate, wherein the conductive structure is located on a side of the active area;
        on a side of the conductive structure away from the active area, a side surface of the conductive structure is substantially flush with a side surface of the first substrate; and
        an opposite substrate disposed opposite to the array substrate, wherein on the side where the conductive structure is located, an edge of an orthographic projection of the opposite substrate on a plane where the array substrate is located is located outside an edge of the array substrate,
        wherein the conductive structure is only disposed outside the active area; and
    the array substrate further includes:
        a plurality of gate lines disposed on the first substrate and located in the active area; and a first gate driving circuit disposed on the first substrate, wherein the first gate driving circuit is disposed outside the active area; and in an extension direction of the gate lines, the conductive structure and the first gate driving circuit are located on two opposite sides of the active area, respectively, wherein the plurality of gate lines are coupled to the conductive structure and the first gate driving circuit, wherein the conductive structure includes metal patterns and semiconductor patterns, and the conductive structure is a remaining portion of a second gate driving circuit, the remaining portion of the second gate driving circuit does not drive the plurality of gate lines;

wherein the display panel further has a bonding area, and the bonding area is configured to be bonded to driving circuits;

in a direction perpendicular to the extension direction of the gate lines, the bonding area is located on one of two opposite sides of the active area;

on a side where the bonding area is located, an edge of the orthographic projection of the opposite substrate on the plane where the array substrate is located is located on an inner side of an edge of the array substrate, and the orthographic projection of the opposite substrate on the plane where the array substrate is located does not overlap with the bonding area.

2. The display panel according to claim 1, wherein, on a side where the first gate driving circuit is located, a side surface of the opposite substrate is substantially flush with a side surface of the array substrate.

3. The display panel according to claim 1, wherein a distance, on the side where the conductive structure is located, between the edge of the array substrate and an edge of the active area is less than a distance, on a side where the first gate driving circuit is located, of an edge of the array substrate and an edge of the active area.

4. The display panel according to claim 1, wherein in the direction perpendicular to the extension direction of the gate lines, on a side of the active area opposite to the bonding area, a side surface of the array substrate is substantially flush with a side surface of the opposite substrate; or in the direction perpendicular to the extension direction of the gate lines, on the side of the active area opposite to the bonding area, an edge of the array substrate is located on an inner side of an edge of the orthographic projection of the opposite substrate on the plane where the array substrate is located.

5. The display panel according to claim 4, wherein a distance, on the side where the conductive structure is located, between an edge of the array substrate and an edge of the active area is equal to a distance, on the side of the active area opposite to the bonding area, between an edge of the array substrate and an edge of the active area.

6. The display panel according to claim 1, wherein on the side where the conductive structure is located, a distance between an edge of the array substrate and an edge of the orthographic projection of the opposite substrate on the plane where the array substrate is located is in a range of 0.05 mm to 0.2 mm, inclusive.

7. The display panel according to claim 1, wherein the opposite substrate includes:
a second substrate; and a black matrix disposed on the second substrate, wherein the conductive structure is within an orthographic projection of the black matrix on the plane where the array substrate is located.

8. The display panel according to claim 1, further comprising:

a frame sealant, wherein the frame sealant is located on a side of the conductive structure proximate to the opposite substrate, and the frame sealant surrounds the active area;

an orthographic projection of the frame sealant on the first substrate overlaps with an orthographic projection of the conductive structure on the first substrate;

the side surface, away from the active area, of the conductive structure is substantially flush with a side surface, located on the side where the conductive structure is located and away from the active area, of the frame sealant;

or an edge, away from the active area, of the orthographic projection of the conductive structure on the first substrate exceeds an edge, located on the side where the conductive structure is located and away from the active area, of the orthographic projection of the frame sealant on the first substrate.

9. The display panel according to claim 8, wherein the edge, away from the active area, of the orthographic projection of the conductive structure on the first substrate exceeds the edge, located on the side where the conductive structure is located and away from the active area, of the orthographic projection of the frame sealant on the first substrate, a distance between the edge, away from the active area, of the orthographic projection of the conductive structure on the first substrate and the edge, located on the side where the conductive structure is located and away from the active area, of the orthographic projection of the frame sealant on the first substrate is in a range of 0.5 mm to 1 mm, inclusive; and a width of the frame sealant is in a range of 0.5 mm to 2 mm, inclusive.

10. The display panel according to claim 1, further comprising:

an insulating adhesive, the insulating adhesive at least covering a side surface of the display panel on the side where the conductive structure is located, wherein the display panel further comprises a frame sealant, an edge, away from the active area, of an orthographic projection of the conductive structure on the first substrate exceeds an edge, located on the side where the conductive structure is located and away from the active area, of an orthographic projection of the frame sealant on the first substrate, and the insulating adhesive further covers a portion, exceeding the frame sealant in a direction away from the active area, of the conductive structure.

11. A display device, comprising: at least two display panels according to claim 1, wherein each display panel is configured to be capable of being spliced at least at an edge of the display panel on the side where the conductive structure is located.

12. The display device according to claim 11, wherein the display panel further has a bonding area, the display panel is further configured capable of being spliced at an edge of the display panel opposite to an edge of the display panel on a side where the bonding area is located;

the display device comprises four display panels, and the four display panels are arranged in an array;

two display panels in a same row are spliced with each other at edges thereof on sides where conductive structures are located; and two display panels in a same column are spliced with each other at edges thereof opposite to edges thereof on sides where bonding areas are located.

13. The display device according to claim 11, wherein a distance between edges of active areas at a splicing position where two adjacent display panels are proximate to each other is in a range of 2 mm to 5 mm, inclusive.

14. The display device according to claim 11, further comprising:
    at least two driving chips, wherein each driving chip is bonded to a single display panel, and the driving chip is configured to drive the display panel to perform display; and
    a control mainboard coupled to the at least two driving chips, wherein the control mainboard is configured to provide control signals to the at least two driving chips, so as to control the driving chips to drive the display panels bonded to the driving chips to perform display.

15. A method for manufacturing a display panel, comprising:
    providing a display panel motherboard, wherein the display panel motherboard includes an array substrate motherboard and an opposite substrate motherboard that are arranged opposite to each other;
    the display panel motherboard has a plurality of active areas;
    the array substrate motherboard includes a plurality of gate lines located in each active area, and first gate driving circuits and second gate driving circuits that are both disposed outside the plurality of active areas only, a first gate driving circuit of the first gate driving circuits and a second gate driving circuit of the second gate driving circuits being located on two opposite sides of each active area in an extension direction of the plurality of gate lines;
    the first gate driving circuit and the second gate driving circuit are coupled to the plurality of gate lines; and
    cutting the array substrate motherboard and the opposite substrate motherboard, so as to cut off portions of the second gate driving circuits to form a plurality of display panels, wherein each display panel has an active area, and includes an array substrate and an opposite substrate;
    the array substrate includes a first substrate, and the plurality of gate lines, a first gate driving circuit and a remaining portion of a second gate driving circuit that are disposed on the first substrate;
    on a side of the remaining portion of the second gate driving circuit, a side surface of the remaining portion of the second gate driving circuit is substantially flush with a side surface of the first substrate;
    on a side where the remaining portion of the second gate driving circuit is located, an edge of an orthographic projection of the opposite substrate on a plane where the array substrate is located is located outside an edge of the array substrate,
    wherein the remaining portion of the second gate driving circuit includes metal patterns and semiconductor patterns, and the remaining portion of the second gate driving circuit does not drive the plurality of gate lines;
    wherein the display panel further has a bonding area, and the bonding area is configured to be bonded to driving circuits;
        in a direction perpendicular to the extension direction of the gate lines, the bonding area is located on one of two opposite sides of the active area;
        on a side where the bonding area is located, an edge of the orthographic projection of the opposite substrate on the plane where the array substrate is located is located on an inner side of an edge of the array substrate, and the orthographic projection of the opposite substrate on the plane where the array substrate is located does not overlap with the bonding area.

16. The display panel according to claim 4, wherein in the direction perpendicular to the extension direction of the gate lines and on the side of the active area opposite to the bonding region, the edge of the array substrate is located on the inner side of the edge of the orthographic projection of the opposite substrate on the plane where the array substrate is located,
    a distance, on the side where the conductive structure is located, between the edge of the array substrate and the edge of the orthographic projection of the opposite substrate on the plane where the array substrate is located is equal to a distance, on the side of the active area opposite to the bonding area, between the edge of the array substrate and the edge of the orthographic projection of the opposite substrate on the plane where the array substrate is located.

* * * * *